United States Patent
Smeets

(10) Patent No.: US 8,326,266 B2
(45) Date of Patent: Dec. 4, 2012

(54) REDUNDANT CREDENTIALED ACCESS TO A SECURED NETWORK

(75) Inventor: Bernard Smeets, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 378 days.

(21) Appl. No.: 12/786,602

(22) Filed: May 25, 2010

(65) Prior Publication Data

US 2011/0296495 A1    Dec. 1, 2011

(51) Int. Cl.
*H04M 3/16*    (2006.01)

(52) U.S. Cl. ............... 455/410; 455/411; 455/550.1; 726/5; 713/168

(58) Field of Classification Search .......... 455/410, 455/411, 550.1; 726/5; 713/168
See application file for complete search history.

(56) References Cited

U.S. PATENT DOCUMENTS

| | | | |
|---|---|---|---|
| 2003/0220101 A1 | 11/2003 | Castrogiovanni et al. | |
| 2004/0204089 A1 | 10/2004 | Castrogiovanni et al. | |
| 2006/0053296 A1* | 3/2006 | Busboom et al. | 713/182 |
| 2006/0129848 A1 | 6/2006 | Paksoy et al. | |
| 2006/0136717 A1 | 6/2006 | Buer et al. | |
| 2006/0293028 A1 | 12/2006 | Gadamsetty et al. | |
| 2007/0006295 A1* | 1/2007 | Haverinen et al. | 726/14 |
| 2008/0039139 A1 | 2/2008 | Teicher | |
| 2008/0261561 A1 | 10/2008 | Gehrmann | |
| 2008/0307488 A1* | 12/2008 | Hammond et al. | 726/1 |
| 2009/0069050 A1* | 3/2009 | Jain et al. | 455/558 |
| 2009/0253410 A1 | 10/2009 | Fitzgerald et al. | |
| 2009/0271852 A1* | 10/2009 | Torres et al. | 726/6 |
| 2009/0298467 A1 | 12/2009 | Zohar | |
| 2011/0053560 A1* | 3/2011 | Jain et al. | 455/411 |
| 2011/0261787 A1* | 10/2011 | Bachmann et al. | 370/331 |

FOREIGN PATENT DOCUMENTS

| | | |
|---|---|---|
| CN | 101076052 | 11/2007 |
| EP | 1239687 A1 | 9/2002 |
| EP | 1257106 A1 | 11/2002 |
| FR | 2814029 A1 | 3/2002 |
| WO | 02/19664 A2 | 3/2002 |
| WO | 02/21867 A2 | 3/2002 |
| WO | 03/084265 A1 | 10/2003 |

OTHER PUBLICATIONS

Author Unknown. "eCall-Saving Lives through In-Vehicle Communication Technology." European Commission, Information Society and Media, General Fact Sheet 49, Jun. 2008.
Trusted Computing Group. "TCG Specification Architecture Overview." Specification Revision 1.3, Mar. 28, 2007.

\* cited by examiner

*Primary Examiner* — Danh Le
(74) *Attorney, Agent, or Firm* — Coats & Bennett, P.L.L.C.

(57) ABSTRACT

A mobile communication device is configured to provide redundant credentialed access to one or more secured wireless communication networks. The mobile device obtains credentialed access to one of the secured networks by remotely using credentials stored in a credentialed communication device that is locally available (i.e., in the vicinity of the mobile device). Responsive to detecting the actual, or potential, compromise of the mobile device's credentialed access to that secured network, the mobile device switches to other credentials stored in a different credentialed device and obtains credentialed access to one of the secured networks by remotely using those other credentials. This switching occurs dynamically upon detecting the compromise of credentialed access, as well as automatically without requiring the mobile device's user to manually enter commands into the device's user interface.

22 Claims, 9 Drawing Sheets

REDUNDANT CREDENTIALED ACCESS TO A SECURED NETWORK

TECHNICAL FIELD

The present invention generally relates to mobile communication devices, and particularly relates to providing mobile communication devices with redundant credentialed access to a secured wireless communication network.

BACKGROUND

Mobile communication devices, such as handheld telephones, PDAs, vehicle-mounted communication devices, etc., are unique as compared to many other types of consumer electronics in that their usage almost always depends on their end users entering into usage subscription agreements. Such agreements may be straightforward default cost/term agreements, such as prepaid and pay-as-you go agreements, while other agreements establish minimum service agreement time periods and may involve a complex package of services and features.

According to the subscription model, a given mobile communication device must be authorized before it can be used (at least for non-emergency services), and, in almost all cases, the credentials for providing and maintaining that authorization must be secure to prevent misuse or outright fraud. The Global Services for Mobile communications (GSM) standards have long addressed these concerns through the use of a Subscriber Identity Module (SIM). A SIM is implemented on a tamper-resistant Universal Integrated Circuit Card (UICC) that is inserted into a particular mobile communication device. With the UICC inserted into the device, the associated SIM provides the device with credentials that give the device access to one or more secured wireless communication networks.

That said, various technologies (e.g., the Bluetooth SIM Access Profile technology) have been developed that permit a device to remotely use the SIM (i.e., credentials) of another device via a local communication link. For example, a vehicle today may be equipped with a vehicle-mounted communication device (e.g., a car phone) that, as compared to a driver's handheld device, offers greater convenience, quality of service, and/or safety. To realize these advantages while at the same time avoiding having to enter into a separate subscription agreement for the vehicle-mounted device, a driver may actually access a secured wireless network using the vehicle-mounted device's user interface, wireless transceiver, etc., but acquire authorization for that access by remotely using the SIM of the driver's handheld device.

Despite these developments, devices still must be statically configured to remotely use the credentials of another device, often with complicated and cumbersome manual processes. Configuring a device to remotely use the credentials of another device may entail, for example, performing various security-related steps on one or both of the devices by physically inputting special commands into the device(s).

Accordingly, statically configuring a device (e.g., a vehicle-mounted device) to remotely use the credentials of a certain credentialed device (e.g., a handheld device) leads to a user solely relying on that credentialed device for access to a secured network. Indeed, even if the user has in his or her possession another credentialed device (e.g., a laptop) via which to access the secured network, the user may not know the commands to enter into the device(s) in order to switch from remotely using the credentials of one device to remotely using the credentials of the other device. Thus, if the former credentialed device fails, or credentialed access is otherwise lost, the user will be left without credentialed access.

Leaving a user without credentialed access is unacceptable in many situations, such as an emergency situation (e.g., a vehicle accident), Yet, in an emergency situation, even if the user knows the requisite commands, the user may then be physically unable to enter those commands, or the user interface(s) via which the user would enter those commands into the device(s) may no longer function.

SUMMARY

Teachings herein advantageously provide a mobile communication device with redundant credentialed access to one or more secured networks. The mobile device obtains credentialed access to the one or more secured networks by remotely using the credentials stored in a nearby credentialed device. If the mobile device detects that its credentialed access has been compromised, the mobile device switches to different credentials stored in a different nearby credentialed device. This switching occurs dynamically upon detecting the compromise of credentialed access, as well as automatically without requiring the mobile device's user to manually enter commands into the device's user interface.

More particularly, the mobile device in some embodiments includes a local communication interface communicatively coupling the mobile device to one or more credentialed devices, which are locally available to (i.e., in the vicinity of) the mobile device. The mobile device also includes one or more processing circuits. The one or more processing circuits are configured to obtain credentialed access to one of the secured networks by remotely using credentials stored in a locally available credentialed device. The one or more processing circuits are also configured to detect the compromise of credentialed access by detecting one or more access compromise conditions that indicate the actual, or potential, compromise of the mobile device's credentialed access to that secured network via remote use of those credentials.

In some embodiments, for example, the one or more processing circuits are configured to detect that credentialed access to the secured network has been lost. In other embodiments, the one or more processing circuits are configured to detect that, although credentialed access to that secured network has not been altogether lost, the quality of service of that access has fallen below a pre-determined threshold (e.g., a quality of service required for emergency calls).

In yet other embodiments, the one or more processing circuits are configured to detect that physical impact has been imparted to the mobile device, or to the credentialed device storing the credentials being remotely used to access the secured network. These embodiments are particularly applicable in the case that the mobile device comprises a vehicle-mounted communication device (e.g., a car phone), whereby such physical impact may indicate that a vehicle accident or crash has occurred. In other embodiments, the one or more processing circuits are configured to detect that the remaining battery life of the credentialed device storing the credentials being remotely used to access the secured network has fallen below a respective threshold level (e.g., 10% of the full battery life). These and other embodiments may also be combined, to provide a mobile device that detects a range of possible actual, or potential, access compromise conditions.

Responsive to detecting any or all of these access compromise conditions, the one or more processing circuits are configured to automatically switch to other credentials stored in a different credentialed device and to obtain credentialed access to one of the secured networks by remotely using those other credentials. This automatic switching between credentials gives the mobile device more robust and reliable credentialed access to the one or more secured networks.

In some instances, the mobile device may have to select the credentials to which it automatically switches from amongst a plurality of credentials stored in a plurality of different credentialed devices. In some embodiments, the mobile device is configured to make this selection based on predetermined selection criteria. This criteria may include, for example, which credentials are stored in a credentialed device that has the best quality of service, or the longest remaining battery life. The criteria may also include which credentials provide access to a preferred secured network, or to a secured network that offers certain services (e.g., localization services for emergency calls).

In various embodiments, any given credentialed device may protect against unauthorized remote use of its credentials by requiring that the mobile device provide it with certain use authorization information (e.g., a personal identification number, PIN). The mobile device in these embodiments is nonetheless configured to automatically switch to the credentials of a protected credentialed device, without the user having to manually input that use authorization information. The mobile device may, for instance, store use authorization information for each of one or more credentialed devices, and automatically acquire authorization to remotely use the credentials of a given credentialed device by sending to the credentialed device the use authorization information stored for that device.

The use authorization information stored for each of one or more credentialed devices may itself be protected against public exposure. The use authorization information may, for example, be encrypted during its transfer between the mobile device and a credentialed device. Alternatively, or additionally, the use authorization information may be sealed in a trusted module of the mobile device, rather than simply stored in general memory, so that the information can only be retrieved (i.e., unsealed) when the one or more access compromise conditions have been detected.

Of course, the present invention is not limited to the features and advantages of the above embodiments. Indeed, those skilled in the art will recognize additional features and advantages upon reading the following detailed description, and upon viewing the accompanying drawings.

DETAILED DESCRIPTION

Figure 1:
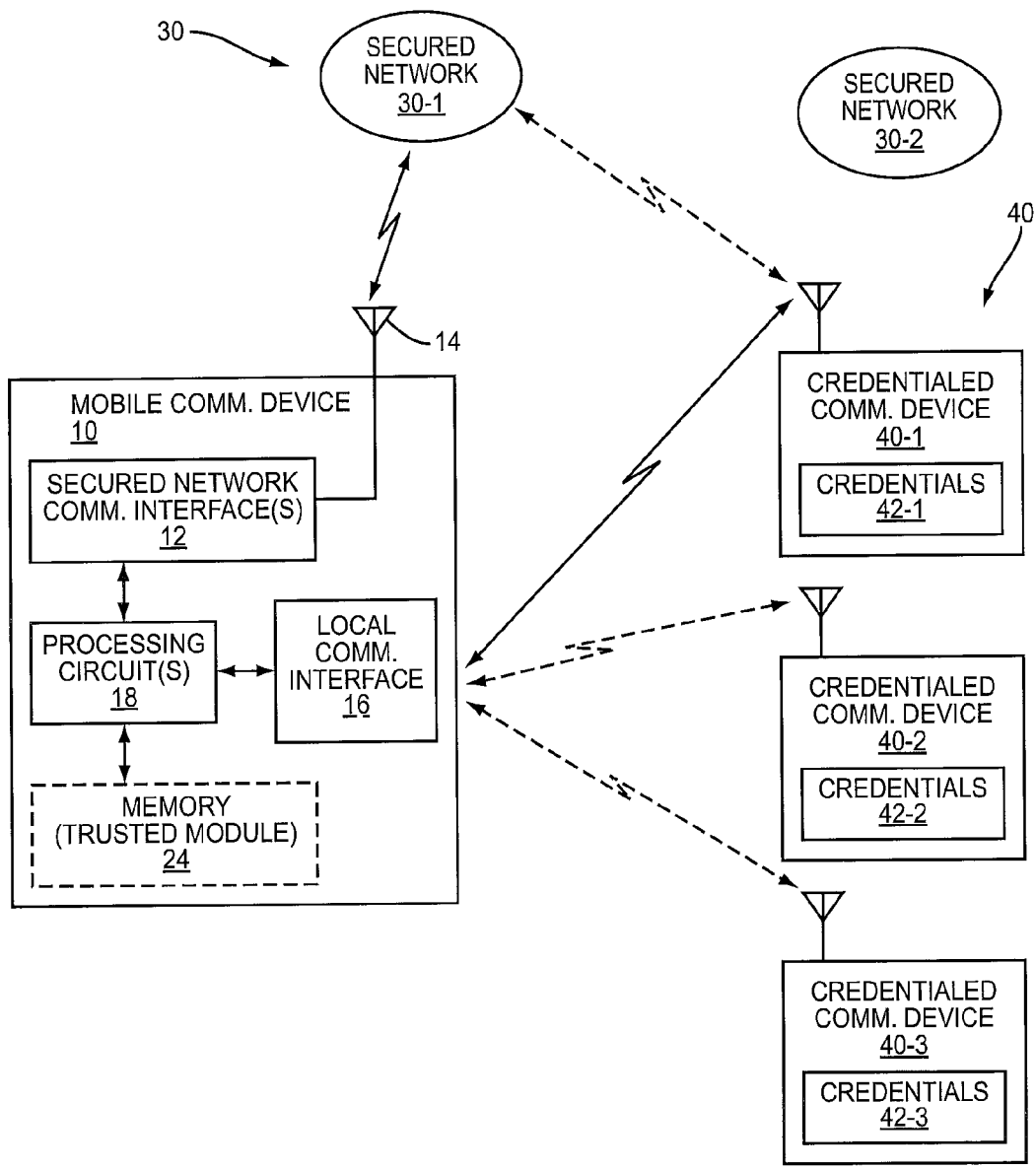
FIG. 1 is a block diagram illustrating a mobile communication device configured to provide redundant access to one or more secured wireless communication networks according to one embodiment of the present invention.

FIG. 1 illustrates a mobile communication device 10, one or more secured wireless communication networks 30, and a plurality of credentialed communication devices 40 that are locally available to (i.e., in the vicinity of) the mobile communication device 10.

The one or more secured wireless communication networks 30 (referred to herein for convenience simply as "secured networks") may include one or more GSM networks, one or more Wideband CDMA (WCDMA) networks, one or more Long Term Evolution (LTE) networks, or any combination of the like. Secured network 30-1 shown in FIG. 1, for example, may be a WCDMA network, while secured network 30-2 may be an LTE network.

The mobile communication device 10 (again, referred to herein for convenience as "mobile device") may comprise a handheld telephone, a PDA, a vehicle-mounted (e.g., vehicle-integrated) communication device, or the like. Regardless, the mobile device 10 is configured to communicate over an air interface with any of the secured networks 30. The mobile device 10 thus includes one or more secured network communication interfaces 12 and one or more antennas 14 configured to operate according to the respective communication standards of the one or more secured networks 30.

Each of the locally available credentialed communication devices 40 (referred to as "credentialed devices") are themselves configured to communicate over an air interface with at least one of the secured networks 30. Credentialed device 40-1, for instance, may be a handheld telephone configured to communicate with secured network 30-1, and credentialed device 40-2 may be a different handheld telephone configured to communicate with secured network 30-2. Credentialed device 40-3 may be a laptop configured to communicate with either secured network 30-1 or 30-2.

The one or more secured networks 30, however, are "secured" in the sense that, in order for the mobile device 10, or any of the credentialed devices 40, to actually obtain access to a given network 30, that device's access must be authorized by the given network 30. Each of the credentialed devices 40, therefore, stores credentials 42 that provide it with the authorization required to obtain access to at least one of the secured networks 30. Credentialed device 40-1, for example, is configured to obtain credentialed access to secured network 30-1 using credentials 42-1 stored therein. Likewise, credentialed device 40-2 is configured to obtain credentialed access to secured network 30-2 using credentials 42-2, while credentialed device 40-3 is configured to obtain credentialed access to either secured network 30-1 or 30-2 using credentials 42-3. By contrast, the mobile device 10 may not store any credentials and thus may not itself have authorization to access any of the secured networks 30.

Accordingly, in order for the mobile device 10 to obtain credentialed access to the one or more secured networks 30, the mobile device 10 is configured to remotely use the credentials 42 stored in a credentialed device 40. That is, to obtain credentialed access to a given one of the secured networks 30 (e.g., secured network 30-1), the mobile device 10 is configured to actually access that secured network 30 by using secured network communication interface(s) 12 and antenna(s) 10, but to acquire authorization for that access by remotely using the credentials 42 (e.g., credentials 42-1) stored in a given one of the credentialed devices 40 (e.g., credentialed device 40-1).

The mobile device's credentialed access, however, may be lost or become unacceptable for any of a number of possible reasons. For example, the credentialed device 40 storing the credentials 42 the mobile device 10 is remotely using to acquire authorization for that access may fail. Alternatively, the quality of service provided to the mobile device 10 by the accessed secured network 30 may fall below some minimum level. The mobile device 10 of the present invention therefore is advantageously configured to provide redundant credentialed access to the one or more secured networks 30.

More particularly, the mobile device 10 includes a local communication interlace 16 communicatively coupling the mobile device 10 to one or more of the credentialed devices 40, which again are locally available to (i.e., in the vicinity of) the mobile device 10. The local communication interface 18 may, for instance, be configured to establish a local communication link between the mobile device 10 and one or more of the credentialed devices 40. The local communication interlace 16 in some embodiments, for example, includes a Bluetooth interface. In this case, the local communication interface 16 is configured to perform a so-called Bluetooth pairing process, whereby the mobile device 10 and one or more of the credentialed devices 40 agree to communicate with each other and establish a Bluetooth link between them.

Figure 2:
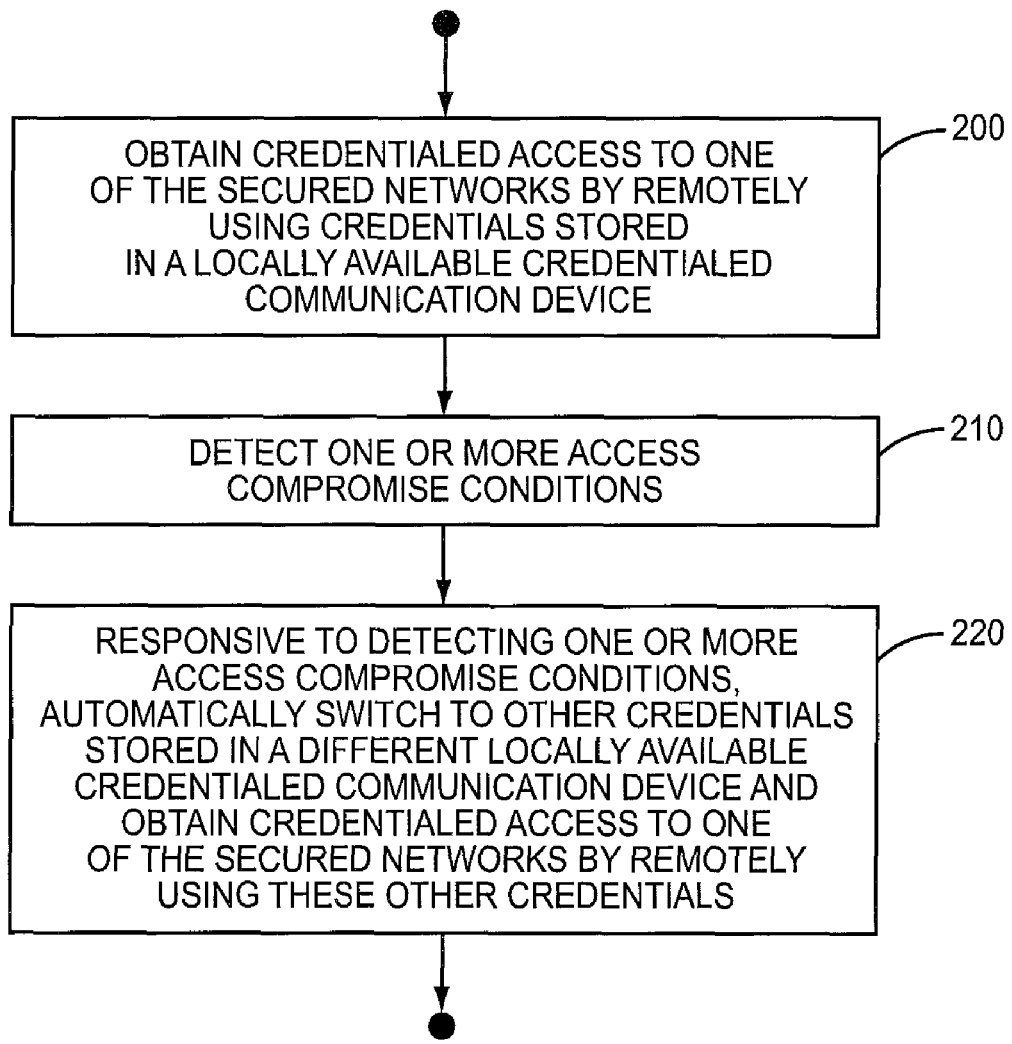
FIG. 2 is a logic flow diagram illustrating a method implemented by a mobile communication device for redundant credentialed access to one or more secured wireless communication networks according to one embodiment of the present invention.

The mobile device 10 also includes one or more processing circuits 18 configured to carry out the processing illustrated in FIG. 2. As shown in FIG. 2, the one or more processing circuits 18 are configured to obtain credentialed access to one of the secured networks 30 (e.g., secured network 30-1) by remotely using credentials 42 (e.g., credentials 42-1) stored in a locally available credentialed device 40 (e.g., credentialed device 40-1) (Block 200). This remote use may occur via a local communication link established by the local communication interface 16 between the credentialed device 40-1 and the mobile device 10, and via a communication protocol configured specifically for such remote use (e.g., Bluetooth SIM Access Profile).

The one or more processing circuits 18 are also configured to detect one or more access compromise conditions that indicate the actual, or potential, compromise of the mobile device's credentialed access to that secured network 30-1 via remote use of those credentials 42-1 (Block 210). In some embodiments, for example, the one or more processing circuits 18 are configured to detect that credentialed access to the secured network 30-1 has been lost. In other embodiments, the one or more processing circuits 18 are configured to detect that, although credentialed access to that secured network 30-1 has not been altogether lost, the quality of service of that access has fallen below a pre-determined threshold. This pre-determined threshold may be, for example, some minimum quality of service required for emergency calls. These example access compromise conditions of course reactively indicate actual problems that the one or more processing circuits 18 have detected as occurring with the mobile device's credentialed access.

In yet other embodiments, the one or more processing circuits 18 are configured to alternatively or additionally detect access compromise conditions that more proactively indicate the mere potential for credentialed access problems. For example, the one or more processing circuits 18 in some embodiments are configured to detect that physical impact has been imparted to the mobile device 10, or to the credentialed device 40-1 storing the credentials 42-1 being remotely used to access the secured network 30-1. These embodiments are particularly applicable in the case that the mobile device 10 comprises a vehicle-mounted communication device (e.g., a car phone). In this case, the one or more processing circuits 18 may be configured to detect that a vehicle accident or crash has occurred. In other embodiments, the one or more processing circuits 18 are configured to detect that the remaining battery life of the credentialed device 40-1 storing the credentials 42-1 being remotely used to access the secured network 30-1 has fallen below a respective threshold level (e.g., 10% of the full battery life). In each of these embodiments, the conditions detected by the one or more processing circuits 18 do not necessarily indicate the actual compromise of the mobile device's credentialed access, but nonetheless indicate the potential compromise of that access.

Responsive to detecting some or all of these access compromise conditions, whether they indicate the actual or potential compromise of the mobile device's credentialed access, the one or more processing circuits 18 are configured to automatically switch to other credentials 42 (e.g., credentials 42-2 or 42-3) stored in a different credentialed device 40 (e.g., credentialed device 40-2 or 40-3) (Block 220). The one or more processing circuits 18 are then configured to obtain credentialed access to one of the secured networks 30 (e.g., secured network 30-1 or 30-2) by remotely using those other credentials.

The automatic switching between credentials 42 in this way gives the mobile device 10 more robust and reliable credentialed access to the one or more secured networks 30. Indeed, even if the mobile device's credentialed access to the one or more secured networks 30 using certain credentials 42 is actually compromised, or has the potential to be compromised, the mobile device 10 dynamically maintains credentialed access to the one or more secured networks 30 by using other credentials 42. This occurs dynamically upon detecting the actual or potential compromise of credentialed access, as well as automatically without requiring the mobile device's user to manually enter commands into the device's user interface.

Figure 3A:
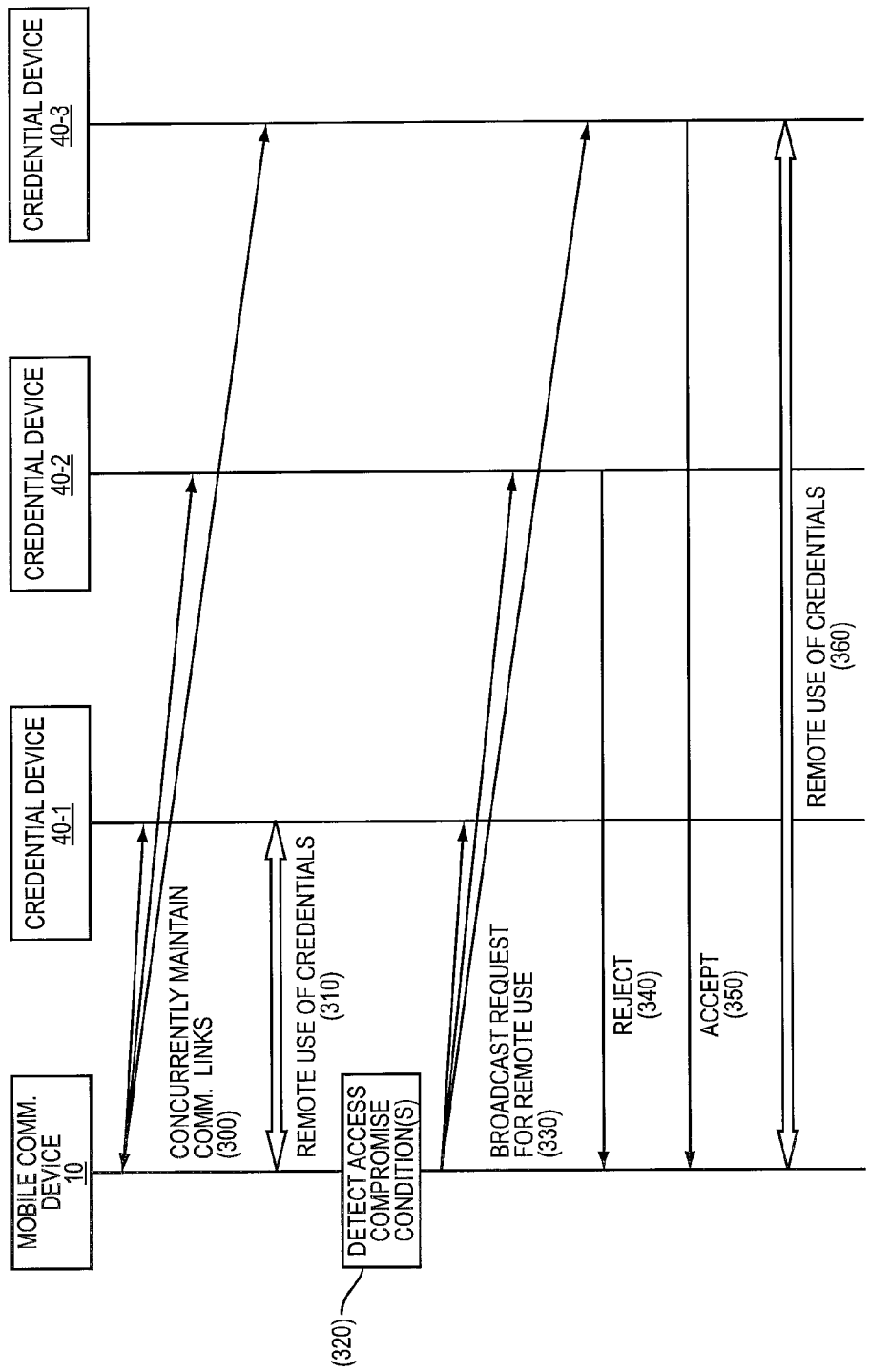
FIGS. 3A-3B are call flow diagrams illustrating examples of various embodiments for coordinating the selection of credentials amongst a plurality of credentialed devices.
Figure 3B:
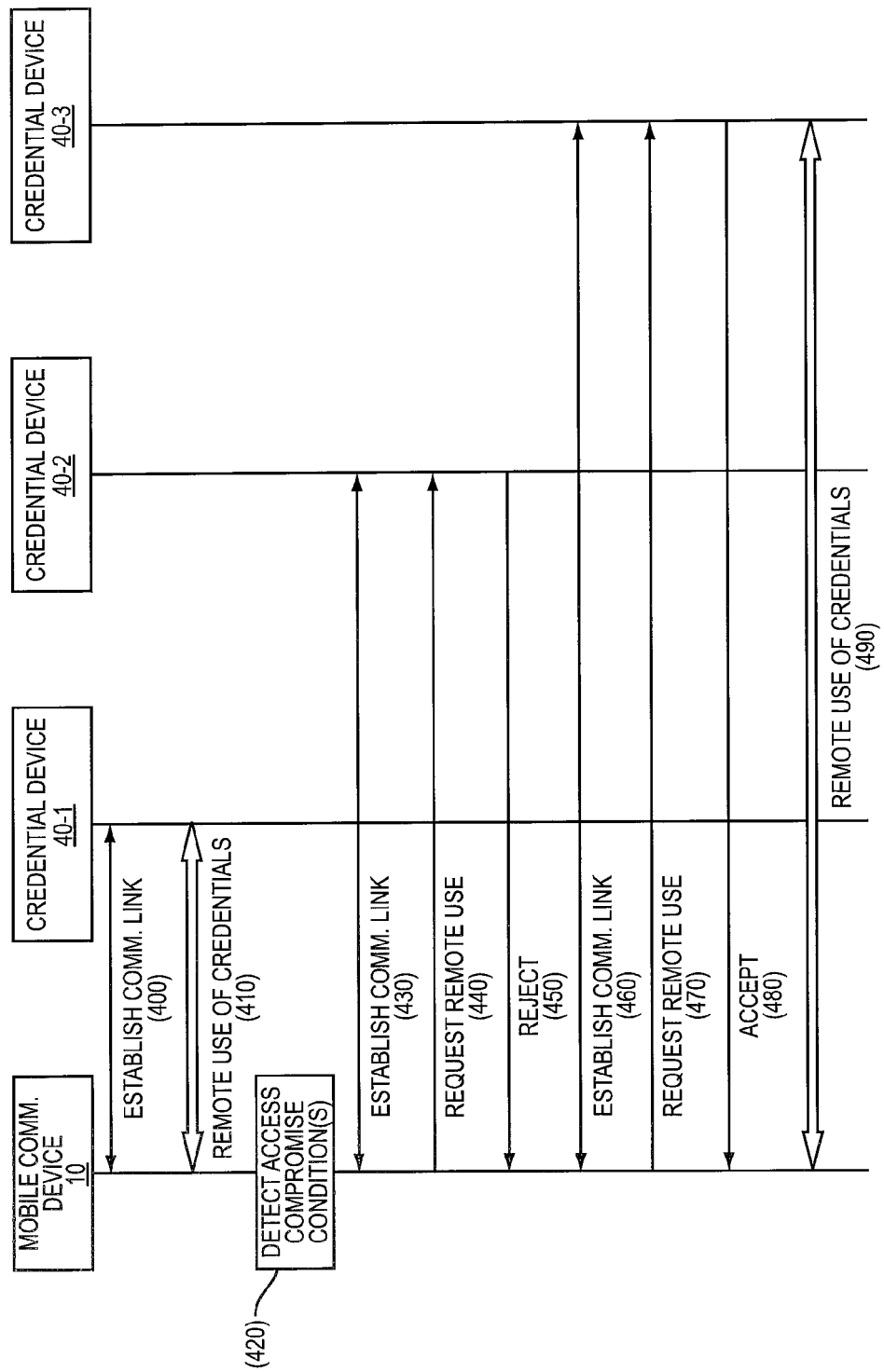

FIGS. 3A-3B illustrate additional details of various embodiments for coordinating amongst the credentialed devices 40 which credentials 42 the mobile device 10 automatically switches to responsive to detecting the one or more access compromise conditions. In embodiments illustrated by the example of FIG. 3A, the mobile device 10 is configured to concurrently maintain local communication links (e.g., Bluetooth links) with each of credentialed devices 40-1, 40-2, and 40-3 (Step 300). The mobile device 10 then obtains access to secured network 30-1 by remotely using the credentials 42-1 stored by credentialed device 40-1 (Step 310). That is, although the mobile device 10 concurrently maintains a communication link with each of credentialed devices 40-1, 40-2, and 40-3, the mobile device 10 only remotely uses the credentials 42-1 of credentialed device 40-1.

This is particularly advantageous in cases where remotely using the credentials 42 of a credentialed device 40 prevents that credentialed device 40 from itself obtaining credentialed access to the one or more secured networks 30 with those credentials 42. By merely maintaining a local communication link with credentialed devices 40-2 and 40-3, as opposed to actually reserving their credentials 42-2 and 42-3 for remote use, the mobile device 10 is configured to preserve the ability of credentialed devices 40-2 and 40-3 to themselves obtain credentialed access and to otherwise operate normally.

At the same time, by concurrently maintaining these local communication links, the mobile device 10 is able to quickly coordinate amongst the credentialed devices 40-1, 40-2, and 40-3 which credentials to remotely use upon the actual or potential compromise of credentialed access. That is, upon detecting the compromise of credentialed access with respect to a given one of the credentialed devices (e.g., device 40-1), the mobile device 10 does not have to then establish local communication links with one or more of the remaining credentialed devices 40-2 and 40-3. In FIG. 3A, for instance, the mobile device 10 is configured to detect one or more access compromise conditions (Step 320) and, responsive thereto, coordinate amongst the plurality of credentialed devices, via the concurrently maintained communication links, to which credentials the mobile device 10 automatically switches (Steps 330-360).

Specifically, the mobile device 10 coordinates amongst credentialed devices 40-1, 40-2, and 40-3 by broadcasting, via the concurrently maintained communication links, a request for remote use of credentials 42 (Step 330). In some circumstances, such as those where credentialed access has been compromised due to the failure of credentialed device 40-1, credentialed device 40-1 may not receive and/or respond to the broadcasted request. Other credentialed devices 40, such as credentialed device 40-2, may receive the broadcasted request, but may nonetheless respond by rejecting the request if for example, as described in more detail below, the mobile device 10 is not authorized to use that device's credentials 42-2 (Step 340). Still other credentialed devices, such as credentialed device 40-3, may respond by accepting the request (Step 350). In this case, the mobile device 10 automatically switches to the credentials 42-3 of that device 40-3 and obtains credentialed access to either secured network 30-1 or 30-2 by remotely using those credentials 42-3 (Step 360).

FIG. 3B, by contrast, illustrates an example of embodiments where the mobile device 10 does not concurrently maintain local communication links with each credentialed device 40 and does not broadcast a request for remote use to all of those credentialed devices 40. Instead, the mobile device 10 establishes a local communication link with a credentialed device 40 on an as-needed basis, in order to sequentially poll credentialed devices 40 for permission to remotely use the credentials 42 stored therein.

As shown in FIG. 3B, for example, the mobile device 10 is configured to establish a local communication link with credentialed device 40-1 (Step 400) and to obtain access to secured network 30-1 by remotely using the credentials 42-1 stored by that credentialed device 40-1 (Step 410). Only upon detecting one or more access compromise conditions (Step 420) does the mobile device 10 establish a local communication link with credentialed device 40-2 (Step 430). By way of that local communication link, the mobile device 10 sends a request to credentialed device 40-2 for remote use of credentials 42-2 stored therein (step 440). As above, credentialed device 40-2 may respond by rejecting that request (Step 450).

Having been rejected by credentialed device 40-2, the mobile device 10 may then establish a local communication link with credentialed device 40-3 (Step 460) in order to send a request to that device 40-3 for remote use of credentials 42-3 (Step 470). If credentialed device 40-3 responds by accepting the request (Step 480), the mobile device 10 may then automatically switch to the credentials 42-3 of that device 40-3 and obtain credentialed access to either secured network 30-1 or 30-2 by remotely using those credentials 42-3 (Step 490).

In one embodiment, the mobile device 10 is configured to automatically switch to the credentials 42 of the first credentialed device 40 that responds by accepting the request (e.g., as illustrated in FIG. 3B). In another embodiment, however, the mobile device 10 is configured to continue sequentially polling all or substantially all of the credentialed devices 40 locally available, even after receiving a response that accepted the request.

Accordingly, whether the mobile device 10 is configured to broadcast a request to all credentialed devices 40 as in FIG. 3A or to sequentially poll those credentialed devices 40 as in FIG. 3B, the mobile device 10 may receive more than one response that accepts the request(s) for remote use of credentials 42 (e.g., if both credentialed devices 40-2 and 40-3 had responded by accepting the request(s)). In this case, the mobile device 10 may have to select the credentials 42 to which it automatically switches from amongst a plurality of credentials 42 stored in a plurality of different credentialed devices 40. In some embodiments, the mobile device 10 is configured to make this selection based on pre-determined selection criteria.

The pre-determined selection criteria include, in one embodiment, which of the plurality of credentials 42 are stored in a credentialed device 40 that has the best quality of service (based on the assumption that the mobile device 10 will experience a similar quality of service were it to use these credentials 42). In this case, the credentialed devices 40 may each report along with their response a given quality of service metric (e.g., signal strength, transmission error rate, etc.) indicating the quality of service currently experienced by that device 40. The mobile device 10 may then select the credentials 42 stored in the credentialed device 40 reporting the best quality of service.

In another embodiment, the pre-determined selection criteria include which of the plurality of credentials 42 provides access to a preferred one of the secured networks 30. The mobile device 10 may, for instance, maintain a list of secured networks 30 that is ordered in terms of preferred access, and select the credentials 42 that, according to the list, provide access to the most preferred secured network 30. Secured network preference may be coarsely indicated by the types or technologies of the networks (e.g., GSM, WCDMA, LTE) or more finely indicated by specific identifiers of the networks, even among those of the same type.

In yet another embodiment, the pre-determined selection criteria include which of the plurality of credentials 42 provide access to a secured network 30 that offers one or more given services (e.g., localization services for emergency calls). The determination of whether a secured network 30 offers the one or more given services may be dynamically based upon representations by each secured network 30 whether it currently offers those services, or statically based upon pre-configured information in the mobile device 10 concerning the service offerings of the secured networks 30.

In still another embodiment, the pre-determined selection criteria include which of the plurality of credentials 42 are stored in a credentialed device 40 that has the longest remaining battery life. By selecting these credentials 42, the mobile device 10 may reduce the likelihood of, or at least prolong, having to select yet different credentials 42 because of the potential compromise of the device's credentialed access.

Those skilled in the art will of course appreciate that the mobile device 10 may independently select credentials 42 based on any of the above selection criteria. The mobile device 10 may also select credentials 42 based on some combination of these criteria. Moreover, the mobile device 10 may be configured to select credentials 42 based on certain criteria, depending on the particular one or more access compromise conditions detected. Consider, for example, the case where the mobile device 10 detects that its credentialed access has been compromised because the remaining battery life of the credentialed device 40 storing the credentials 42 being remotely used has fallen below a threshold level. In this case, the mobile device 10 may be configured to select credentials 42 from amongst a plurality of credentials 42 based on which credentials 42 are stored in a credentialed device 40 that has the longest remaining battery life. Otherwise, the mobile device 10 may be configured to select credentials 42 based on different criteria (e.g., quality of service).

Those skilled in the art will also appreciate that FIGS. 3A-3B merely illustrate non-limiting examples. Accordingly, various embodiments of the present invention may include any combination of these examples. For instance, the mobile device 10 may be configured to concurrently maintain communication links with each credentialed device 40-1, 40-2, and 40-3, as in FIG. 3A, but to sequentially poll the credentialed devices 40-1, 40-2, and 40-3 for remote use of credentials stored therein as in FIG. 3B.

Figure 4:
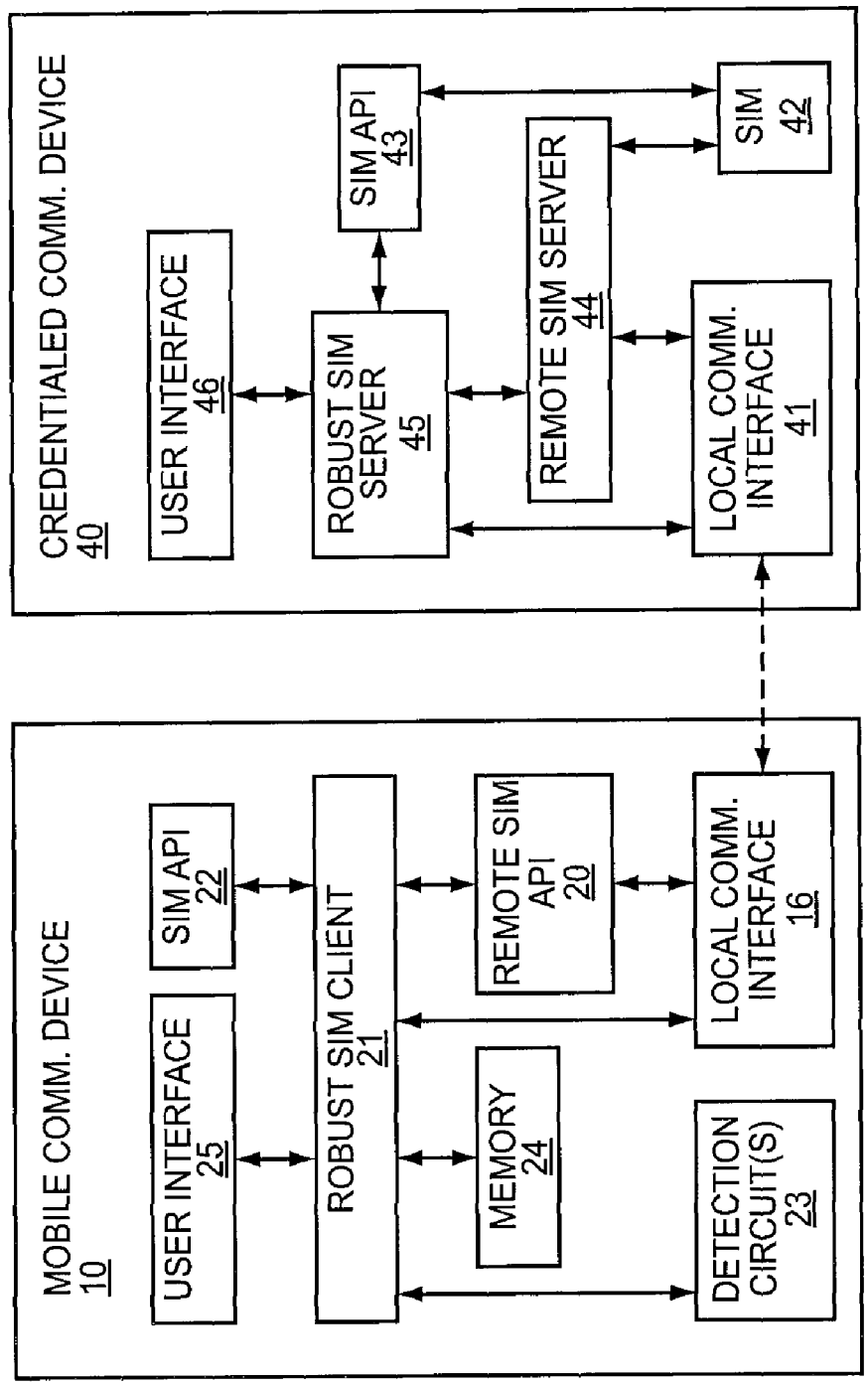
FIG. 4 is a block diagram illustrating a mobile communication device configured to remotely use credentials embodied as a Subscriber Identity Module (SIM) of a credentialed device according to one embodiment of the present invention.

Furthermore, those skilled in the art will appreciate that the credentials 42 described thus far may be embodied as a Subscriber Identity Module (SIM) implemented on a Universal Integrated Circuit Card (UICC), a Universal SIM (USIM) implemented on a UICC, a CDMA Subscriber Identify Module (CSIM) implemented on a UICC, a SIM, USIM, or CSIM implemented in software, or the like. FIG. 4, for example, illustrates the credentials 42 embodied as a SIM implemented in hardware or software.

As seen in FIG. 4, a credentialed device 40 includes a local communication interface 41, which establishes a local communication link with a respective local communication interface 16 of the mobile device 10. The credentialed device 40 further includes a SIM 42 that, for example, securely stores a service-subscriber key (IMSI) used to identify a subscriber and to authenticate a device 10, 40 to one or more of the secured networks 30. Also, the credentialed device 40 includes a SIM API 43 and a remote SIM server 44 configured to render the SIM 42 available to the remote SIM API 20 at the mobile device 10 (e.g., via Bluetooth SIM Access Profile technology).

To coordinate the occurrence of this without unnecessarily preventing the credentialed device 40 from itself using the SIM 42, the credentialed device 40 includes a robust SIM server 45 and the mobile device 10 includes a robust SIM client 21. The robust SIM client 21 requests, e.g., when detection circuit(s) 23 of the mobile device 10 detect the one or more access compromise conditions, that the robust SIM server 45 render the SIM 42 available at the mobile device 10. The robust SIM server 45 responds by rejecting or accepting that request as described above. If the robust SIM server 45 responds by accepting the request, it directs the remote SIM server 44 accordingly. Only at this point is the credentialed device 40 prevented from using the SIM 42 itself. The robust SIM server 45 may then inform the user of the credentialed device 40, via user interface 46, that credentialed access by the device 40 is currently prevented by the mobile device's remote use of its SIM 42.

In various embodiments, any given credentialed device 40 may protect against unauthorized remote use of its credentials 42 by requiring that the mobile device 10 provide it with certain use authorization information (e.g., a personal identification number, PIN). The mobile device 10 in these embodiments is nonetheless configured to automatically switch to the credentials 42 of a protected credentialed device 40, without the user having to manually input that use authorization information, In some embodiments, for example, the mobile device 10 further includes a memory 24 that is configured to store, for each of one or more credentialed devices 40, use authorization information that permits the mobile device 10 to acquire authorization from the credentialed device 10 to remotely use the credentials 42 stored therein. Responsive to detecting the one or more access compromise conditions, the mobile device 10 automatically switches to different credentials 42 stored in a different credentialed device 40 as described above. In order to do so in these embodiments, though, the mobile device 10 first acquires authorization from that different credentialed device 40 to remotely use the credentials 42 stored therein, based on the use authorization information stored in the memory 24 for that device 40.

Figure 5A:
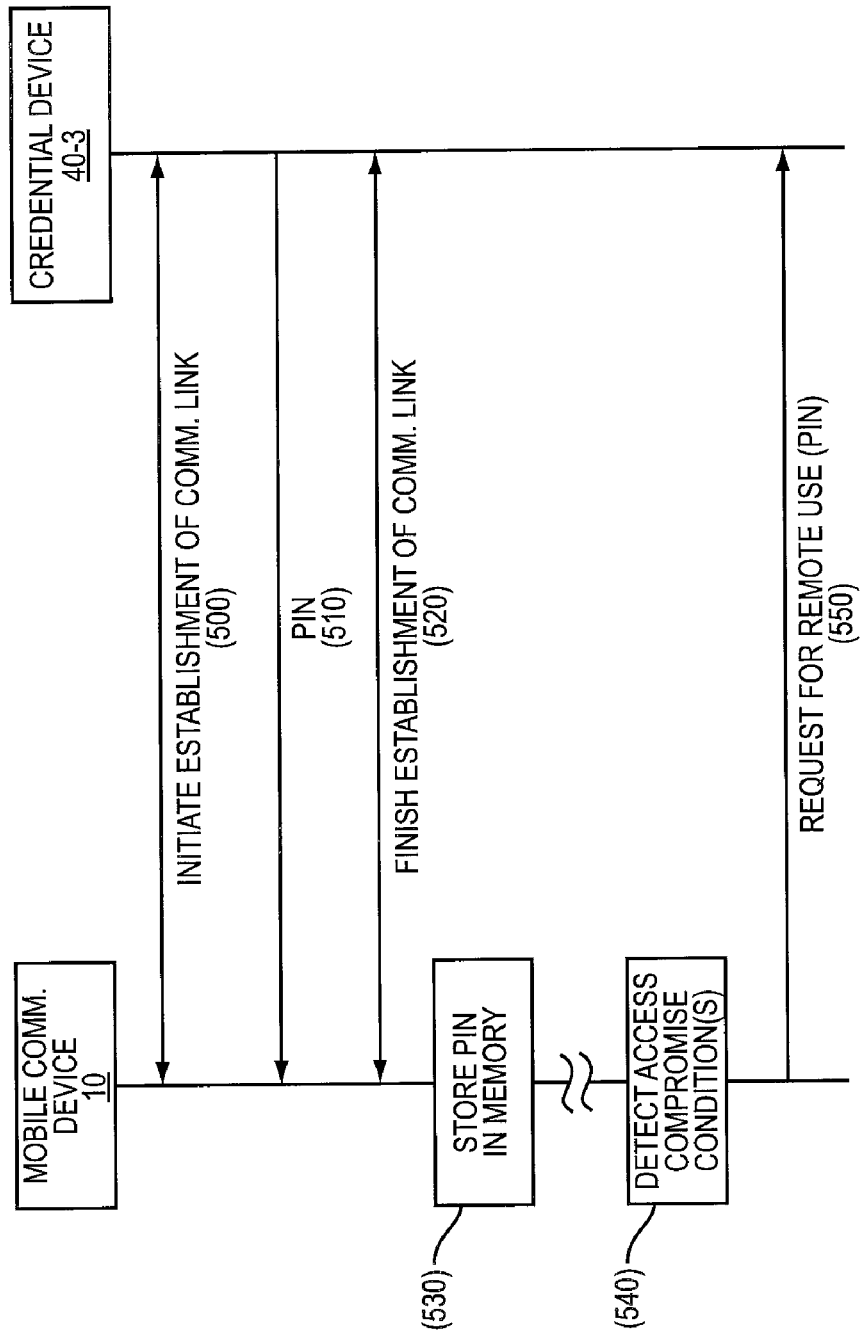
FIGS. 5A-5C are call flow diagrams illustrating examples of various embodiments for securely storing the credentials of a credentialed device.

FIG. 5A illustrates an example whereby this use authorization information comprises a PIN. In FIG. 5A, a credentialed device 40 (e.g., credentialed device 40-3) provisions the mobile device 10 with the PIN required to remotely use its credentials 42-3 during the process of establishing a local communication link between the devices. Where the communication link is a Bluetooth communication link, this process may be a Bluetooth pairing process. Regardless, at some point between the mobile device 10 and the credentialed device 40-3 initiating (Step 500) and finishing (Step 520) the establishment of a communication link between them, the credentialed device 40-3 sends the mobile device 10 its PIN (Step 510). Having received this PIN, the mobile device 10 is configured to store the PIN, along with any other PINs received for other any other credentialed devices 40, in memory 24 for later use (Step 530). Then, upon detecting the one or more access compromise conditions (Step 540), the mobile device 10 may acquire authorization from the credentialed device 40-3 to remotely use its credentials 42-3 by sending the PIN stored for that device 40-3 (Step 550).

As shown, the mobile device 10 may send the PIN as part of the request for remote use of the credentials 42-3. The request in this case is specifically directed to a particular credentialed device 40, as in embodiments where the mobile device 10 sequentially polls the credentialed devices 40 by sending them individual requests. By contrast, where the mobile device 10 broadcasts a general request to all credentialed devices, the mobile device 10 may send the PIN to a particular credentialed device 40-3 as part of some handshake process occurring before or after the request.

Those skilled in the art will of course appreciate that the PIN of credentialed device 40-3 comprises sensitive information, and that therefore its passage between devices 10, 40-3 may be in encrypted form. That is, before sending the PIN to the mobile device 10, the credentialed device 40-3 in some embodiments encrypts the PIN using a key specific to, and derived by, the credentialed device 40-3. The mobile device 10 likewise stores, and ultimately returns, the PIN in this encrypted form, thereby protecting the PIN from public exposure.

Other embodiments employ alternative, or additional, security measures to protect the PIN of a credentialed device 40. In the embodiments illustrated by the example of FIG. 5B, for instance, the mobile device 10 seals the PIN of a credentialed device 40 in a trusted module of the mobile device 10, rather than simply storing it in general memory. So sealed, the PIN is not normally accessible on the mobile device 10 and can only be retrieved (i.e., unsealed) by the mobile device 10 when the one or more access compromise conditions have been detected. Moreover, in some cases, the PIN is stored only on the mobile device 10, not on the credentialed device 40, meaning that the PIN can only be retrieved when the mobile device 10 and the credentialed device 40 are in the vicinity of one another and the one or more access compromise conditions have been detected.

More particularly, after the mobile device 10 begins the process of establishing a local communication link with the credentialed device 40-3 (Step 600), but before that process is completed (Step 640), the mobile device 10 derives an encryption key (Step 610). The mobile device 10 then receives a PIN from the credentialed device 40-3 (Step 620) and seals that PIN in a trusted module using the derived encryption key (Step 630).

Notably, the mobile device's derivation of an encryption key and sealing of a credentialed device's PIN with the key are conditioned on the present involvement of the mobile device 10 in establishing a local communication link with that credentialed device 40-3. Conditioned in this way, the mobile device 10 protects the integrity of encryption keys and the sealing therewith.

Figure 5B:
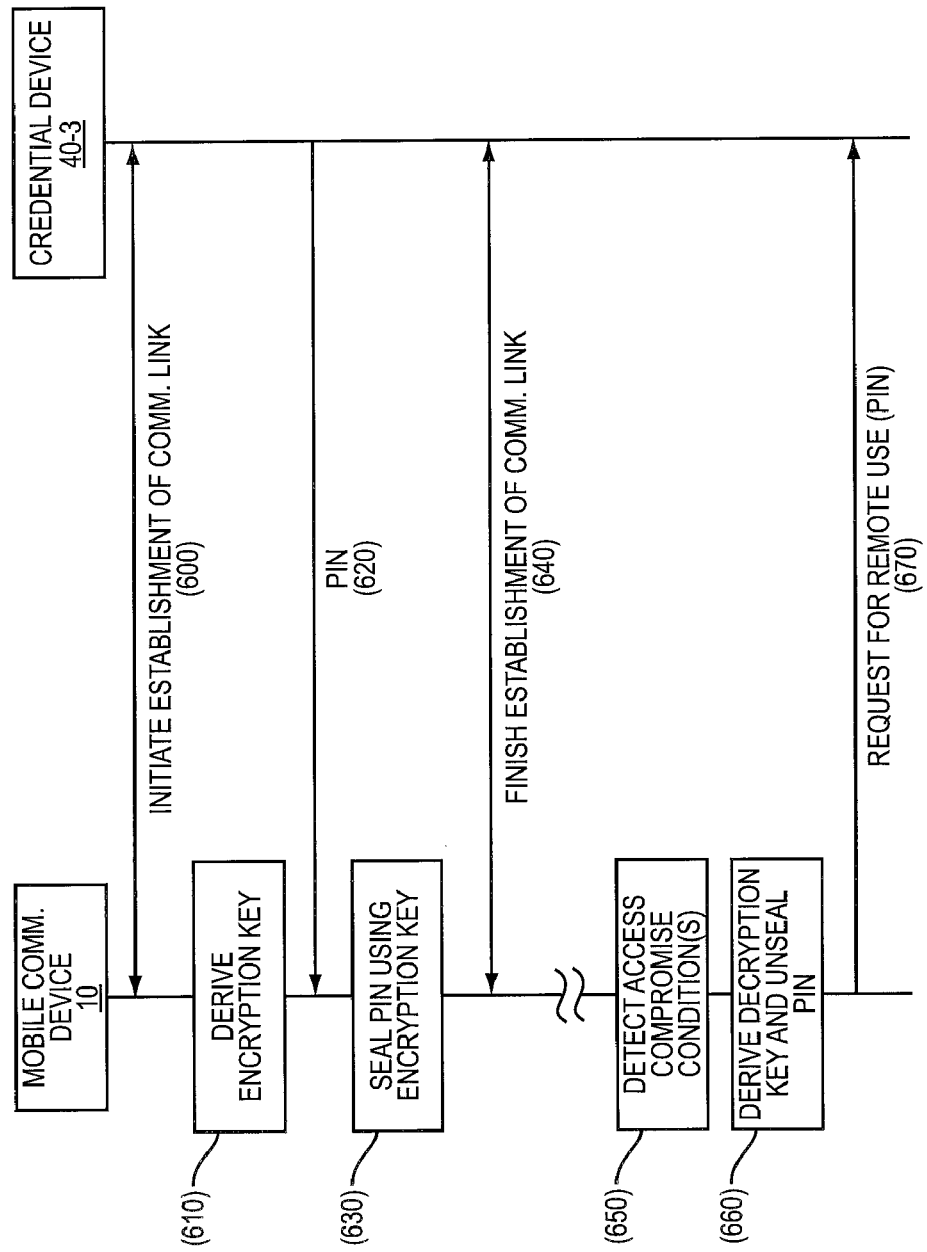

Moreover, the derivation and sealing are ultimately coupled to the detection of the one or more access compromise conditions, in that the mobile device's derivation of a decryption key and unsealing of the PIN with that decryption key are conditioned on such detection. As shown in FIG. 5B, for instance, only after the mobile device 10 detects the one or more access compromise conditions (Step 650) may the device 10 derive a decryption key and unseal the PIN with the derived decryption key (Step 660). Such protects the integrity of decryption keys and the unsealing of PINs with those keys. Having unsealed the PIN, the mobile device 10 acquires authorization from the credentialed device 40-3 to remotely use its credentials 42-3 by sending that PIN to the device 40-3 (Step 670).

As briefly noted above, this sealing and unsealing of PINs stored in the mobile device 10 may be performed instead of, or in addition to, other security measures. In particularly secure embodiments, for example, the mobile device 10 receives the PIN as encrypted by a key specific to, and derived by, the credentialed device 40-3 as discussed above. The mobile device 10 then seals the received PIN by further encrypting the PIN with an encryption key derived by the mobile device 10 during the process of establishing the communication link. The security provided by encrypting the PIN multiple times in this way can even be enhanced further if the mobile device 10 receives the PIN over a local communication link that employs an end-to-end cryptographic protocol at the Transport Layer (e.g., Secure Sockets Layer, SSL, protocol).

Even without regard to any additional security measures taken, however, the trusted module in which a PIN is sealed as described above may include a secure processor, a secure memory, and a cryptographic engine. The trusted module may be configured according to ARM® TrustZone®, Mobile Trusted Module (MTM), or Trusted Platform Module (TPM) implementations. Other secure processing environments can of course be used, and the secure architecture details should not be construed as limiting the teachings presented herein.

Figure 6:
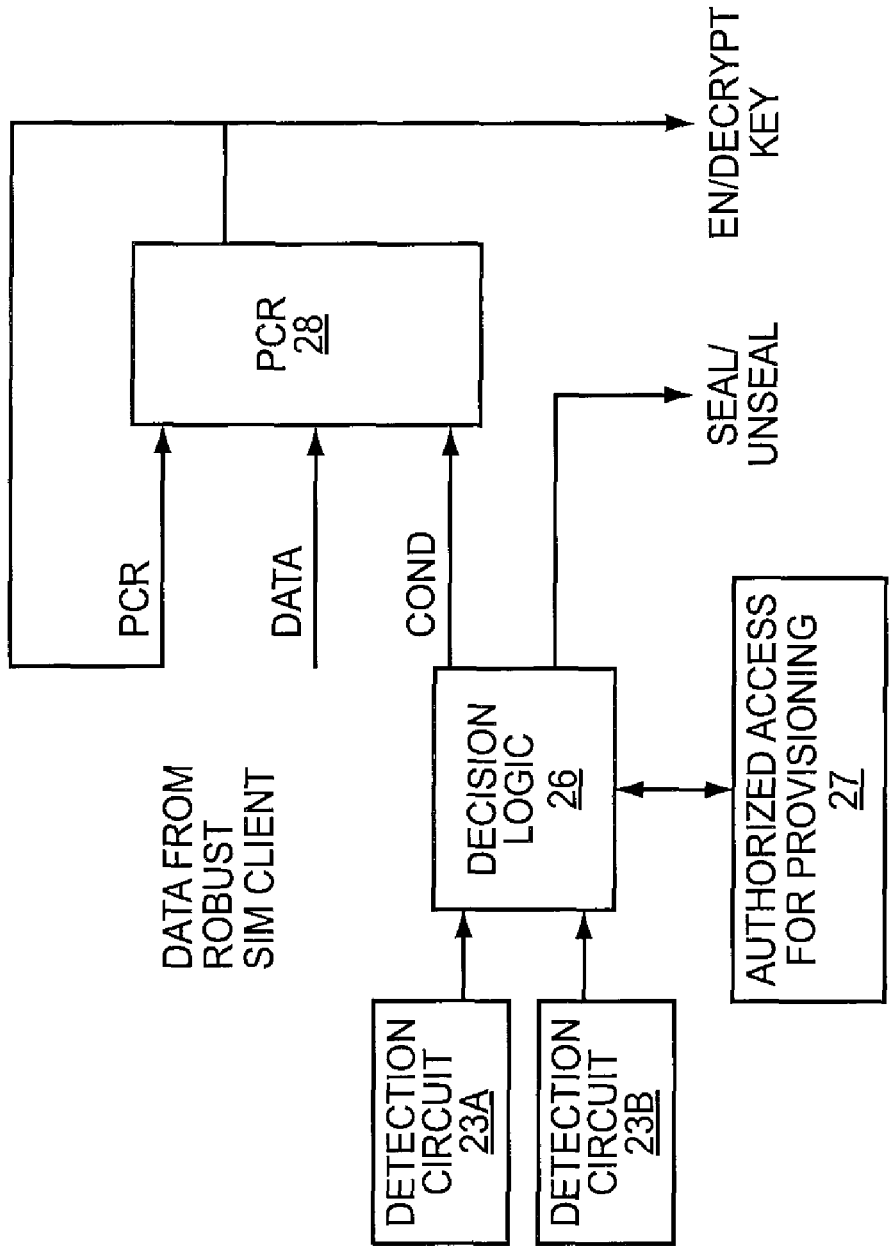
FIG. 6 is a block diagram illustrating a trusted platform module (TPM) of a mobile communication device for securely storing the credentials of a credentialed devices according to embodiments of the present invention.

Consider, for example, FIG. 6, which illustrates the trusted module as a TPM that includes at least one Platform Configuration Register (PCRs) 28 for assisting with the sealed storage of a PIN in secure memory of the TPM. The PCR 28 is a storage register that stores a cryptographic hash value of data (e.g., a SHA-1 digest). The current value in PCR 28 is selectively used as a key to encrypt (seal) or decrypt (unseal) a PIN in the TPM. Specifically, decision logic 26 generates a Seal/Unseal control command that directs the TPM whether to use the current value at all for sealed storage, whether to use the current value as an encryption key for sealing a PIN, or whether to use the current value as a decryption key for unsealing a PIN.

Decision logic 26 directs the TPM to use the current value as an encryption key for sealing a PIN of a given credentialed device 40-3 when the mobile device 10 is presently involved in establishing a local communication link with that device 40-3, as indicated by a specific control signal 27. That is, when the mobile device 10 is initially provisioned with the PIN of a given credentialed device 40-3 upon establishing a local communication link with that device 40-3, the mobile device 10 is explicitly authorized to use the current value to seal that PIN.

Similarly, decision logic 26 directs the TPM to use the current value as a decryption key for unsealing a PIN of a credentialed device 40-3 when the mobile device 10 detects the one or more access compromise conditions, as indicated by one or more detection circuits 23A and 23B. Accordingly, when the one or more detection circuits 23A and 23B detect the one or more access compromise conditions, the mobile device 10 unseals a PIN of a credentialed device 40-3 using the current value. The mobile device 10 then sends the unsealed PIN to that credentialed device 40-3, and thereby acquires authorization from the credentialed device 40-3 to remotely use its credentials 42-3.

Notably, the current value in PCR 28 is itself dependent on whether the mobile device 10 is presently involved in establishing a local communication link, and on the detection of the one or more access compromise conditions, meaning that the current value only properly encrypts or decrypts a PIN upon such occurrence. Furthermore, the current value in PCR 28 is coupled to the mobile device 10 itself (or more specifically to its TPM), meaning that only the mobile device 10 (or its TPM) may encrypt or decrypt a PIN. Still further, the current value in PCR 28 is coupled to previous values in PCR 28, meaning that the encryption or decryption of a PIN can only be performed by a predefined chain of verification and loading actions.

Specifically, the current value in PCR 28 at any given time is:

$$PCR_{new} = Hash(PCR_{old} \| cond \| data) \quad (1)$$

where Hash( . . . ) is a cryptographic hash function, such as SHA-1, ‖ represents a concatenation function, $PCR_{old}$ is the previous value in PCR 28, cond is a value set by decision logic 26, and data is data from the robust SIM client 21. In one embodiment, the cond value is simply a Boolean value that is set to true by the decision logic 26 when the mobile device 10 is presently involved in establishing a local communication link, or when the one or more access compromise conditions are detected. Regardless, the cond value renders the current value in PCR 28 dependent on such occurrence. The data from the robust SIM client 21 similarly renders the current value in PCR 28 specifically dependent on the robust SIM client 21.

Figure 5C:
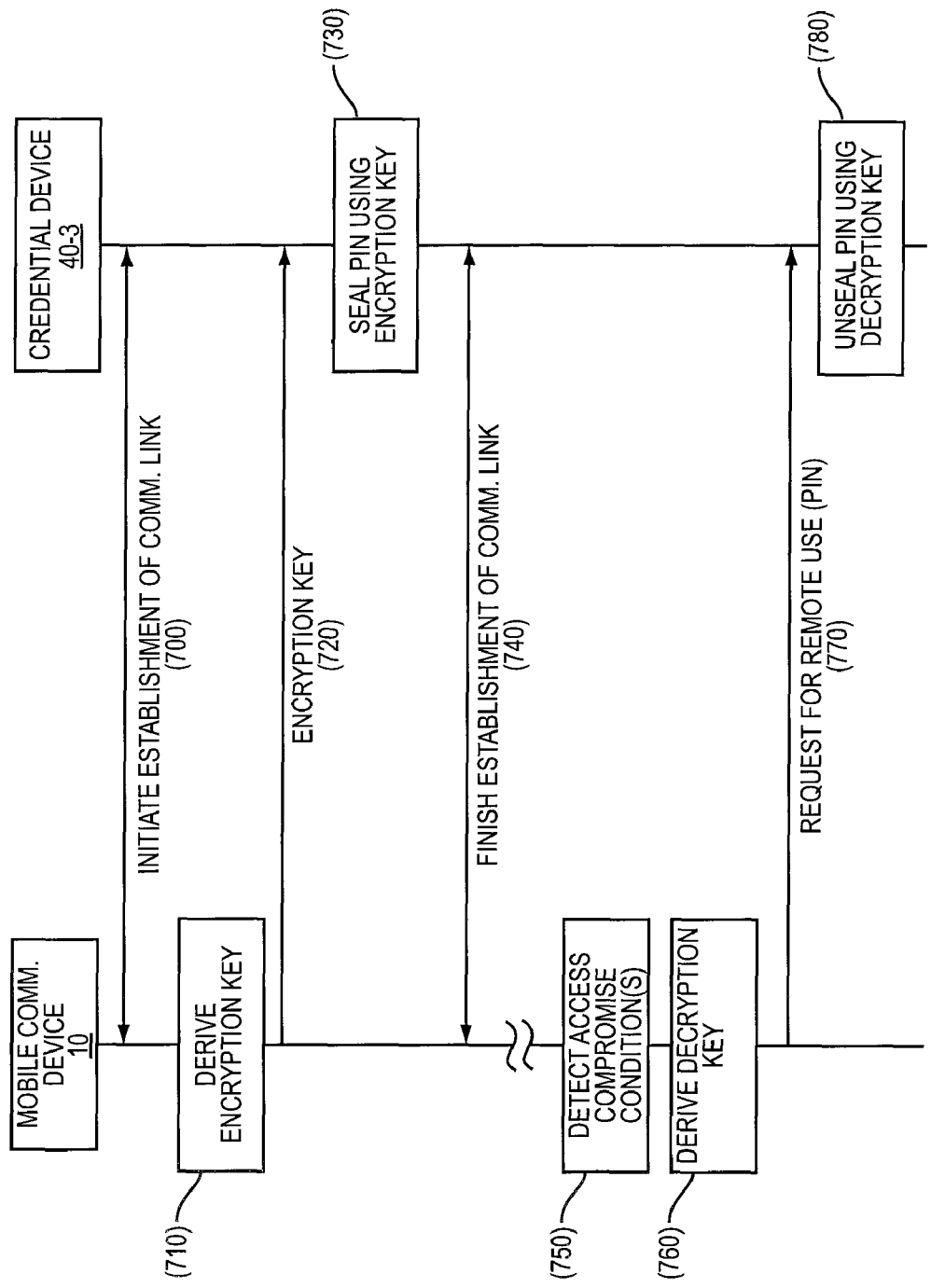

In the embodiments described above with respect to FIG. 5B and FIG. 6, the mobile device 10 stores the PIN of a credentialed device 40 and seals/unseals that PIN in a trusted module of the mobile device 10 with an encryption/decryption key generated by the mobile device 10. In other embodiments, by contrast, the credentialed device 40 stores its own PIN, rather than the mobile device 10 storing the PIN. In these embodiments, the credentialed device 40 seals/unseals the PIN in a trusted module of the credentialed device 40, and does so with an encryption/decryption key generated by the mobile device 10. FIG. 5C illustrates an example of such embodiments.

In FIG. 5C, after the mobile device 10 begins the process of establishing a local communication link with the credentialed device 40-3 (Step 700), but before that process is completed (Step 740), the mobile device 10 derives an encryption key (Step 710) much in the same was as described above with respect to FIG. 5B and FIG. 6. Instead of then receiving a PIN from the credentialed device 40-3 and sealing that PIN in a trusted module, though, the mobile device 10 sends the derived encryption key to the credentialed device 40-3 (Step 720). The credentialed device 40-3 then seals its PIN in a trusted module of the device 40-3 using the encryption key provided by the mobile device 10 (Step 730). Similarly, after the mobile device 10 detects the one or more access compromise conditions (Step 750) the device 10 derives a decryption key and sends the decryption key to the credentialed device 40-3 (Step 760). The credentialed device 40-3 then unseals its PIN using the decryption key provided by the mobile device 10 (Step 770). In some cases, the PIN is stored only on the credentialed device 40, not on the mobile device 10, meaning that the PIN can only be retrieved when the mobile device 10 and the credentialed device 40 are in the vicinity of one another and the one or more access compromise conditions have been detected.

In some embodiments, the encryption and decryption keys derived by the mobile device 10 are unique to each credentialed device 40; that is, the mobile device 10 derives different encryption/decryption keys for sealing/unsealing the PINs of the credentialed devices 40. For example, the current value of PCR 28 may instead be derived according to:

$$PCR_{new} = Hash(PCR_{old} \| cond \| data \| CD_{id}) \quad (2)$$

where $CD_{id}$ is a unique identifier of a given credentialed device 40, e.g., an International Mobile Equipment Identity (IMEI).

Those skilled in the art will of course appreciate that the embodiments in FIGS. 5A-5C were described using PINs merely for illustrative purposes, and that the present invention is not limited in that respect. Indeed, the embodiments apply to PINs, as well as to any other use authorization information that permits the mobile device 10 to acquire authorization from a credentialed device 10 to remotely use the credentials 42 stored therein.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A method implemented by a mobile communication device for redundant credentialed access to one or more secured wireless communication networks, the method comprising:
    obtaining credentialed access to one of said secured networks by remotely using credentials stored in a locally available credentialed communication device that is otherwise configured to itself obtain credentialed access to that secured network using said credentials;
    detecting one or more access compromise conditions indicating the actual, or potential, compromise of the mobile device's credentialed access to the secured network via remote use of said credentials; and
    responsive to said detection, automatically switching to other credentials stored in a different locally available credentialed communication device and obtaining credentialed access to one of said secured networks by remotely using said other credentials.

2. The method of claim 1, further comprising concurrently maintaining local communication links with a plurality of locally available credentialed communication devices, each of which is configured to itself obtain credentialed access to one of said secured networks using credentials stored therein, and coordinating amongst the plurality of credentialed devices, via said local communication links, which credentials the mobile device automatically switches to responsive to said detection.

3. The method of claim 1, wherein automatically switching to other credentials comprises selecting said other credentials from amongst a plurality of credentials stored in a plurality of different locally available credentialed communication devices, based on pre-determined selection criteria.

4. The method of claim 3, wherein selecting said other credentials comprises selecting said other credentials from amongst the plurality of credentials based on one or more of:
    which of the plurality of credentials are stored in a credentialed device that has the best quality of service;
    which of the plurality of credentials are stored in a credentialed device that has the longest remaining battery life;
    which of the plurality of credentials provide access to a preferred one of said secured networks; and
    which of the plurality of credentials provide access to a secured network that offers one or more given services.

5. The method of claim 1, wherein detecting one or more access compromise conditions comprises detecting that access to the secured network via remote use of said credentials has been lost, or a quality of service of that access has fallen below a pre-determined threshold.

6. The method of claim 1, wherein detecting one or more access compromise conditions comprises detecting that physical impact has been imparted to the mobile device, or to the credentialed device storing the credentials being remotely used to access the secured network.

7. The method of claim 1, wherein detecting one or more access compromise conditions comprises detecting that a remaining battery life of the credentialed device storing the credentials being remotely used to access the secured network has fallen below a respective threshold level.

8. The method of claim 1, further comprising storing, for each of one or more locally available credentialed communication devices, use authorization information permitting the mobile device to acquire authorization from that credentialed device to remotely use the credentials stored therein, and wherein automatically switching to other credentials stored in a different credentialed device comprises acquiring authorization from that credentialed device to remotely use the credentials stored therein, based on the use authorization information stored for that device.

9. The method of claim 8, wherein storing use authorization information comprises storing one or more different personal identification numbers, PINs, for the one or more credentialed devices, and wherein acquiring authorization from said different credentialed device comprises sending to the device the PIN stored for that device.

10. The method of claim 8, wherein storing, for each of one or more credentialed devices, use authorization information comprises sealing the use authorization information in a trusted module of the mobile device, the sealing of use authorization information stored for a given credentialed device being conditioned on the present involvement of the mobile device in establishing a local communication link with that device, and wherein acquiring authorization from said different credentialed device comprises unsealing the use authorization information stored for that device, said unsealing being conditioned on the detection of said one or more access compromise conditions, and sending the unsealed use authorization information to that device.

11. The method of claim 1, wherein one or more locally available credentialed communication devices are each configured to store use authorization information permitting other devices to acquire authorization to remotely use the credentials stored therein, and wherein the method further comprises deriving one or more different encryption keys for sealing use authorization information in respective trusted modules of the one or more credentialed devices storing the use authorization information, the derivation of an encryption key for a given credentialed device being conditioned on the present involvement of the mobile device in establishing a local communication link with that device, and wherein acquiring authorization from said different credentialed device comprises deriving a decryption key for unsealing the use authorization information stored in said different credentialed device, said derivation of a decryption key being conditioned on the detection of said one or more access compromise conditions, and sending the derived decryption key to that device.

12. A mobile communication device configured to provide redundant credentialed access to one or more secured wireless communication networks, the mobile communication device comprising:
　a local communication interface communicatively coupling the mobile device to one or more locally available credentialed communication devices; and
　one or more processing circuits configured to:
　　obtain credentialed access to one of said secured networks by remotely using credentials stored in a locally available credentialed communication device that is otherwise configured to itself obtain credentialed access to that secured network using said credentials;
　　detect one or more access compromise conditions indicating the actual, or potential, compromise of the mobile device's credentialed access to the secured network via remote use of said credentials; and
　　responsive to said detection, automatically switch to other credentials stored in a different locally available credentialed communication device and obtain credentialed access to one of said secured networks by remotely using said other credentials.

13. The mobile device of claim 12, wherein the local communication interface is configured to concurrently maintain local communication links with a plurality of locally available credentialed communication devices, each of which is configured to itself obtain credentialed access to one of said secured networks using credentials stored therein, and wherein the one or more processing circuits are configured to coordinate amongst the plurality of credentialed devices, via said local communication links, which credentials the mobile device automatically switches to responsive to said detection.

14. The mobile device of claim 12, wherein the one or more processing circuits are configured to automatically switch to other credentials by selecting said other credentials from amongst a plurality of credentials stored in a plurality of different locally available credentialed communication devices based on pre-determined selection criteria.

15. The mobile device of claim 14, wherein the one or more processing circuits are configured to select said other credentials by selecting said other credentials from amongst the plurality of credentials based on one or more of:
　which of the plurality of credentials are stored in a credentialed device that has the best quality of service;
　which of the plurality of credentials are stored in a credentialed device that has the longest remaining battery life;
　which of the plurality of credentials provide access to a preferred one of said secured networks; and
　which of the plurality of credentials provide access to a secured network that offers one or more given services.

16. The mobile device of claim 12, wherein the one or more processing circuits are configured to detect one or more access compromise conditions by detecting that access to the secured network via remote use of said credentials has been lost, or the quality of service of that access has fallen below a pre-determined threshold.

17. The mobile device of claim 12, wherein the one or more processing circuits are configured to detect one or more access compromise conditions by detecting physical impact imparted to the mobile device or to the credentialed device storing the credentials being remotely used to access the secured network.

18. The mobile device of claim 12, wherein the one or more processing circuits are configured to detect one or more access compromise conditions by detecting that the remaining battery life of the credentialed device storing the credentials being remotely used to access the secured network has fallen below a respective threshold level.

19. The mobile device of claim 12, further comprising a memory configured to store, for each of one or more locally available credentialed communication devices, use authorization information permitting the mobile device to acquire authorization from the credentialed device to remotely use the credentials stored therein, and wherein the one or more processing circuits are configured to automatically switch to other credentials stored in a different credentialed device by acquiring authorization from that credentialed device to remotely use the credentials stored therein, based on the use authorization information stored in said memory for that device.

20. The mobile device of claim 19, wherein the memory is configured to store one or more different personal identification numbers, PINs, for the one or more credentialed devices, and wherein the one or more processing circuits are configured to acquire authorization from said different credentialed device by sending to the device the PIN stored for that device.

21. The mobile device of claim 19, further comprising a trusted module that includes said memory, and wherein the one or more processing circuits are configured to:
　seal use authorization information in said trusted module, the sealing of use authorization information stored for a given credentialed device being conditioned on the present involvement of the mobile device in establishing a local communication link with that device; and
　acquire authorization from said different credentialed device by:
　　unsealing the use authorization information stored for that device, said unsealing being conditioned on the detection of said one or more access compromise conditions; and
　　sending the unsealed use authorization information to that device.

22. The mobile device of claim 12, wherein one or more locally available credentialed communication devices are each configured to store use authorization information permitting other devices to acquire authorization to remotely use the credentials stored therein, and wherein the one or more processing circuits are configured to:

derive one or more different encryption keys for sealing use authorization information in respective trusted modules of the one or more credentialed devices storing the use authorization information, the derivation of an encryption key for a given credentialed device being conditioned on the present involvement of the mobile device in establishing a local communication link with that device; and acquire authorization from said different credentialed device by:

deriving a decryption key for unsealing the use authorization information stored in said different credentialed device, said derivation of a decryption key being conditioned on the detection of said one or more access compromise conditions; and sending the derived decryption key to that device.

\* \* \* \* \*

UNITED STATES PATENT AND TRADEMARK OFFICE
CERTIFICATE OF CORRECTION

PATENT NO. : 8,326,266 B2
APPLICATION NO. : 12/786602
DATED : December 4, 2012
INVENTOR(S) : Smeets Page 1 of 1

It is certified that error appears in the above-identified patent and that said Letters Patent is hereby corrected as shown below:

In Column 4, Line 67, delete "antenna(s) 10," and insert -- antenna(s) 14, --, therefor.

In Column 5, Line 15, delete "interlace" and insert -- interface --, therefor.

In Column 5, Line 18, delete "interface 18" and insert -- interface 16 --, therefor.

In Column 5, Lines 21-22, delete "interlace" and insert -- interface --, therefor.

In Column 9, Line 21, delete "Identify" and insert -- Identity --, therefor.

In Column 10, Line 55, delete "trusted module" and
insert -- trusted module 24 --, therefor at each occurrence throughout the whole specification.

Signed and Sealed this
Ninth Day of April, 2013

Teresa Stanek Rea
*Acting Director of the United States Patent and Trademark Office*